(12) United States Patent
Streeter

(10) Patent No.: US 12,737,376 B2
(45) Date of Patent: Sep. 15, 2026

(54) DATA LAKE LOADER

(71) Applicant: Snowplow Analytics Limited, Greater London (GB)

(72) Inventor: Ian Streeter, Greater London (GB)

(73) Assignee: Snowplow Analytics Limited, Greater London (GB)

( * ) Notice: Subject to any disclaimer, the term of this patent is extended or adjusted under 35 U.S.C. 154(b) by 0 days.

(21) Appl. No.: 18/812,498

(22) Filed: Aug. 22, 2024

(65) Prior Publication Data

US 2025/0068642 A1 Feb. 27, 2025

(51) Int. Cl.
*G06F 16/25* (2019.01)

(52) U.S. Cl.
CPC .................................. *G06F 16/254* (2019.01)

(58) Field of Classification Search
CPC .................................................... G06F 16/254
USPC ......................................................... 707/602
See application file for complete search history.

(56) References Cited

U.S. PATENT DOCUMENTS 11,347,747 B1 5/2022 Paduroiu
11,522,799 B1 * 12/2022 Koutsikos Tsatsalmas ................ H04L 41/0627
11,860,869 B1 * 1/2024 Hwang ............ G06F 16/24549
12,153,597 B1 * 11/2024 Maier .................. G06F 16/254
2020/0364185 A1 * 11/2020 Beier .................. G06F 16/178
2022/0294816 A1 9/2022 Martin et al.

OTHER PUBLICATIONS

Search Report of International Application No. PCT/GB2024/052183 dated Nov. 6, 2024, (3 pages).
Wang Zhenzhao et al., "Latency vs Cost: Data Ingestion Options at Twitter Scale," 2022 IEEE International Conference on Big Data (Big Data), IEEE, Dec. 17, 2022, pp. 223-227, XP034282975, (5 pages).
RDB Loader, Snowplow Documentation, https://web.archive.org/web/20230331041311/https://docs.snowplow.io/docs/destinations/warehouses-and-lakes/rdb/, (3 pages).
S3 Loader, Snowplow Documentation, https://web.archive.org/web/20230331041311/https://docs.snowplow.io/docs/destinations/warehouses-and-lakes/s3/, (3 pages).

* cited by examiner

*Primary Examiner* — Ajay M Bhatia
*Assistant Examiner* — Lauren Zannah Ganger
(74) *Attorney, Agent, or Firm* — Dentons US LLP

(57) ABSTRACT

A data loader for loading event data from a streaming platform to an object storage, the data loader comprising: a memory for caching event data; a local file system for storing event data; and a data processor, wherein the data processor is configured to: receive a plurality of batches of event data from the streaming platform; for each batch of event data from the plurality of batches of event data: cache the batch of event data to the memory; write the batch of event data from the memory to the local file system; and combine the plurality of batches of event data stored in the local file system into an output file; and load the output file from the local file system to the object storage.

16 Claims, 19 Drawing Sheets

| Data Loader | Feature | Properties |
|---|---|---|
| Output File Size | Data loader memory | Enables dynamic schema<br><br>Output file size is limited by data loader memory – less efficient querying |
| Output File Type | Object | Metadata not included |
| Dynamic Schema | Buffered in data loader memory | Limits output file size to memory capacity of data loader |
| Scaling | Horizontal Scaling | Easy deployment – simply add additional data loaders |

FIG. 4

| Cluster | Feature | Properties |
| --- | --- | --- |
| **Output File Size** | Aggregated data at computer node | Large output file<br><br>Does not scale |
| **Output File Type** | Iceberg/Delta | Metadata included |
| **Dynamic Schema** | RDD to executor memory | Does not dynamically scale well to event volume |
| **Scaling** | Additional executors | Inefficient and costly to dynamically add and remove executors and receivers in the cluster |

FIG. 6

| | **Feature** | **Properties** |
|---|---|---|
| **Output File Size** | Direct streaming | Does not enable dynamic schema<br>Frequent Commits to Iceberg/Delta |
| **Output File Type** | Iceberg/Delta | Metadata included |
| **Dynamic Schema** | Not possible | Schema must be initialised before starting stream |
| **Scaling** | Horizontal Scaling | Easy deployment – simply add additional data loaders |

| | Feature | Properties |
|---|---|---|
| **Output File Size** | Local Memory Capacity | Very Large output file<br>Less commits to Iceberg/Delta |
| **Output File Type** | Iceberg/Delta | Metadata included |
| **Dynamic Schema** | RDD to Local Memory | Not limited by data loader memory<br>Dynamically scales well to event volume – increase local memory capacity |
| **Scaling** | Horizontal Scaling and Additional Local Memory | Easy deployment – add additional loaders and/or increase local memory capacity |

FIG. 11

DATA LAKE LOADER

The present application relates to a data loader for loading event data from a streaming platform to an object storage, a method for loading event data from a streaming platform to an object storage and a system and software for carrying out the method.

BACKGROUND

Data loaders extract event data from a streaming platform. The streaming platform can receive information relating to events from a data producer such as a website or a mobile phone application. The information can relate to an event that occurs in the data producer and the information regarding the event can be sent from the data producer to the streaming platform. Subsequently, the streaming platform can send the information to the data loader as event data. Event data can comprise information regarding how a user of the data producer uses the data producer. The event data can comprise behavioural information of the user. The event data can comprise information relating to how the user navigates and/or interacts with the data producer.

Once the data loader receives the event data from the streaming platform, the data loader can load the event data to an object store. The object store can be a cloud object store. A user of the object store can access the event data loaded in the object store for subsequent analysis. For example, the event data in the object store can be copied to a separate data warehouse for subsequent event data analysis by a data application. The data application can be for example a machine learning application.

When loading the event data to the object store, it is desirable to output the event data as a large file. Larger files facilitate efficient data querying at the object store. This is because larger files allow a data query to skip large amounts of query-irrelevant event data and reduce redundant searches on individual event data.

Before loading the event data to the object store, the data loader may process and/or transform the event data. Usually, such processing and transformation of the event data demands substantial amounts of computation by the data loader. This consumes time and energy by the data loader. However, not processing and/or transforming the event data and loading raw event data to object store results in users of the object store to process and transform the event data themselves. Not processing and transforming the event data at the data loader shifts the computation burden on the user of the object store. Accordingly, there is a need to minimise the amount of computation overhead between the data loader and users of the object store.

A schema defines how data is structured in the event data. For example, the schema can define the fields (e.g. event date and name) of the event data and the type of variable (e.g. string, integer, binary) used for each field. A data loader may determine a schema of the event data. However, the schema of the event data could change over time and therefore there is a need to provide a data loader that can dynamically determine the schema of the event data.

The size of the event data from the streaming platform can vary over time. How a user uses the data producer affects the size and nature of the event data. For example, if the user interacts frequently with the data producer, a large size of event data will be sent to the streaming platform from the data producer and consequently, a large size of event data will be received by the data loader. In another example, if the user does not interact frequently with the streaming platform, less event data will be sent to the data loader. In some instances, the size of event data can increase substantially. In such instances, the data pipeline can be bottlenecked by the processing limitations of the data loader. Accordingly, there is a need to provide a data loader that can efficiently and effectively scale in response to changes in the size of the event data.

There is a desire to provide a data loader that resolves at least all the above-mentioned problems when loading event data to an object store. The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

According to a first aspect, there is provided a data loader for loading event data from a streaming platform to an object storage, the data loader comprising: a memory for caching event data; a local file system for storing event data; and a data processor, wherein the data processor is configured to: receive a plurality of batches of event data from the streaming platform; for each batch of event data from the plurality of batches of event data: cache the batch of event data to the memory; write the batch of event data from the memory to the local file system; and combine the plurality of batches of event data stored in the local file system into an output file; and load the output file from the local file system to the object storage.

According to an embodiment, the data processor is further configured to write the batch of event data from the memory to the local file system when the memory capacity is full.

According to an embodiment, the data processor is further configured to periodically combine the plurality of the batches of event data according to a predetermined combining time interval.

According to an embodiment, the data processor is further configured to periodically load at least one batch of event data from the output file to the object storage according to a predetermined loading time interval.

According to an embodiment, the data processor is further configured to transform the output file.

According to an embodiment, the data processor is further configured to transform the output file into a data warehouse compatible format.

According to an embodiment, the data warehouse compatible format allows a data warehouse to create derived tables by querying the output file stored in the object storage.

According to an embodiment, the output file is in a Delta or Iceberg format.

According to an embodiment, the data processor is configured to separate data and metadata in the output file.

According to an embodiment, the data processor is configured to update the metadata of the output file.

According to an embodiment, the data processor is configured to partition the output file by an event field.

According to an embodiment, the event field is date of events and/or name of events.

According to an embodiment, the data processor is configured to compress the output file.

According to an embodiment, the data processor is further configured to process the plurality of batches of event data from the streaming platform.

According to an embodiment, processing the event data from the streaming platform comprises dynamically determining a schema of the plurality of batches of event data.

According to an embodiment, processing the plurality of batches of event data from the streaming platform comprises determining a metadata of the plurality of batches of event data.

According to an embodiment, the metadata comprises at least one of the following: history of event data added to the object storage; a current schema of the data loader; and file level statistics of the event data.

According to an embodiment, loading the output file from the local file system to the object storage is atomic such that either: all the output file in the local file system is successfully uploaded to the object storage; or none of the output file is uploaded to the object storage.

According to an embodiment, the data processor is configured to load any remaining event data stored in the local file system to the object storage if the streaming platform fails.

According to an embodiment, the data processor is configured to return an acknowledgement message to the streaming platform in response to receiving a batch of event data from the streaming platform.

According to an embodiment, the data processor is configured to return the acknowledgement message only if all the event data of the batch of event data from the streaming platform has been loaded to the object storage.

According to an embodiment, the data processor is configured to load event data that failed to be loaded to the object storage to another object storage for later recovery.

According to a second aspect, there is provided a computer implemented method for loading event data from a streaming platform to an object storage via a data loader comprising a memory for caching event data, a local file system for storing event data and a data processor, the method comprising: receiving, by the data processor, a plurality of batches of event data from the streaming platform; for each batch of event data from the plurality of batches of event data: caching, by the data processor, the batch of event data to the memory; writing, by the data processor, the batch of event data from the memory to the local file system; and combining, by the data processor, the plurality of batches of event data stored in the local file system into an output file; loading, by the data processor, the output file from the local file system to the object storage.

According to a third aspect, there is provided a system for storing event data comprising: a data loader according to the first aspect; a streaming platform for sending event data to the data loader; and an object storage for receiving event data from the data loader.

According to an embodiment, the system comprises a plurality of data loaders.

According to an embodiment, the plurality of data loaders do not share data.

According to an embodiment, the system further comprises a database table for providing a locking mechanism between the plurality of data loaders to prevent conflict between concurrent read and/or write commands from the plurality of data loaders to the object storage.

According to an embodiment, the system further comprises a plurality of data warehouses for reading and writing to the object storage.

According to an embodiment, the system further comprises a database table for providing a locking mechanism between the plurality of data warehouses to prevent conflict between concurrent read and/or write commands to object storage from the plurality of data warehouses.

According to an embodiment, the streaming platform manages the distribution of event data to the plurality of data loaders.

According to an embodiment, the object store is a cloud object store.

According to a fourth aspect, there is provided a computer program comprising instructions which, when the program is executed by a computer, cause the computer to carry out the method according to the second aspect.

According to a fifth aspect, there is provided computer-readable medium comprising instructions which, when executed by a computer, cause the computer to carry out the method according to the second aspect.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 4 shows a table summarising characteristics of the first system 1210 for storing event data 100;

FIG. 6 shows a table summarising characteristics of the second system 1220 for storing event data 100;

FIG. 8 shows a table summarising characteristics of the third system 1230 for storing event data 100;

FIG. 11 shows a table summarising characteristics of the fourth system 1240 for storing event data 100;

Figure 1:
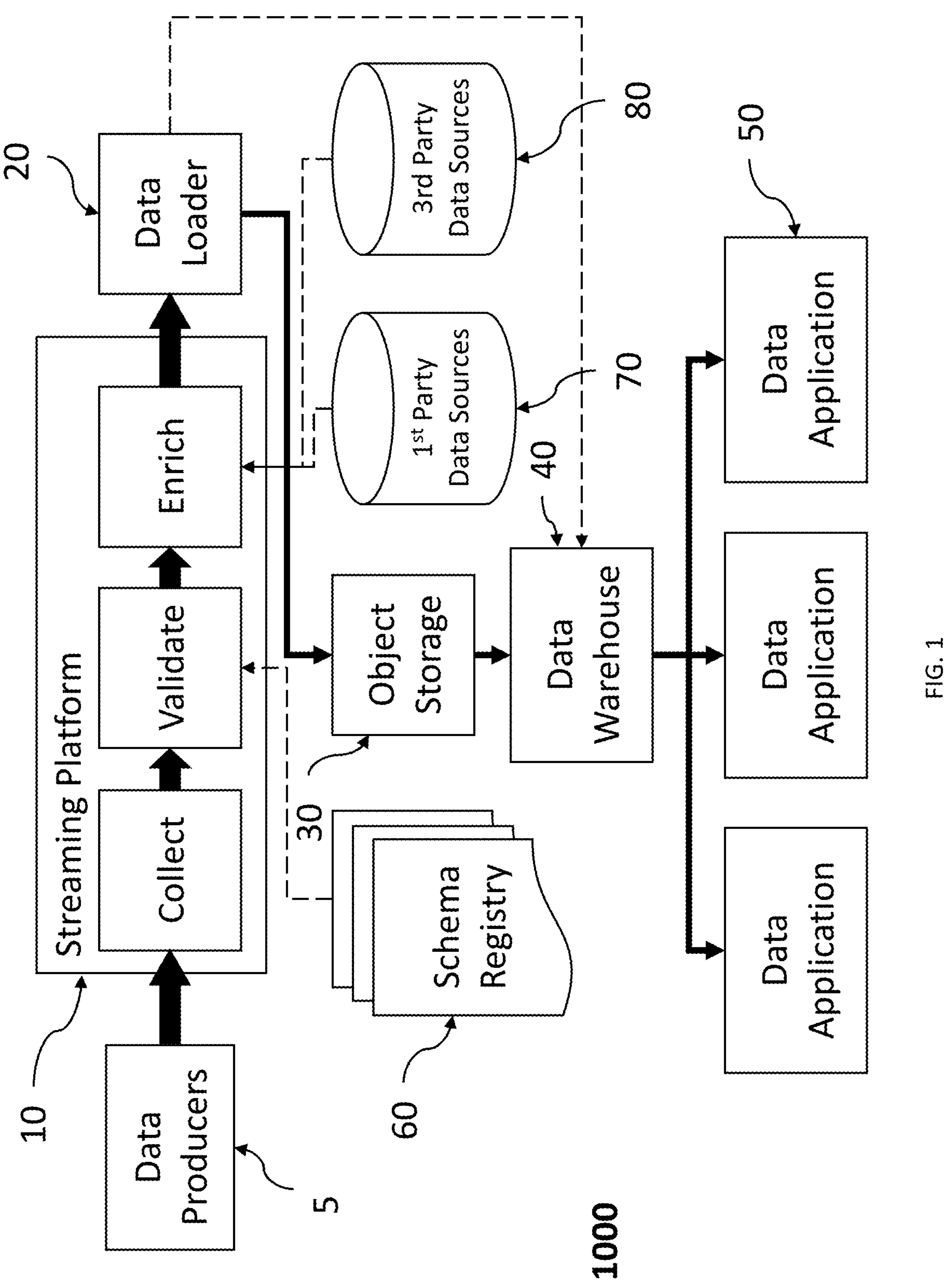
FIG. 1 shows a data pipeline 1000 comprising a data producer 5, a streaming platform 10, a schema registry 60, a first-party streaming platform 70, a third-party streaming platform 80, a data loader 20, an object store 30, a data warehouse 40, a data application 50.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a data pipeline 1000 comprising a data producer 5, a streaming platform 10, a schema registry 60, a first-party streaming platform 70, a third-party streaming platform 80, a data loader 20, an object store 30, a data warehouse 40, a data application 50.

The data pipeline 1000 starts at the data producers 5. The data producers generate event data when a user of the data producer interacts with the data producers. The event data can be generated in real time and collected by the streaming platform 10 in real time. Data producers 5 include, but are not limited to, web and mobile trackers, server-side trackers, pixel trackers and third-party webhooks.

The streaming platform 10 can receive and store the event data from the data producers in a collector of the streaming platform 10. The collector comprises a storage for temporarily storing the event data for subsequent use. The storage can be for example a bucket. Example buckets include, but are not limited to, S3 on Amazon Web Services and Google Cloud Storage on Google Cloud Platform.

The streaming platform 10 subsequently can validate the event data stored in the collector of the streaming platform 10. Validating the event data comprises determining if the event data received by the collector meets a predetermined set of criteria. An example criterion can be a schema criterion. A user of the streaming platform 10 can set a schema criterion such that any event data that does not have a specific schema is not sent to the data loader 20. Optionally, event data that does not meet the validation criteria can be moved to a separate object storage for later recovery. The schema criteria can be stored in a schema registry 60 and the streaming platform 10 can read and/or write the schema criteria in the schema registry 60.

Event data that meets the validation criteria are subsequently enriched by the streaming platform 10. Enriching the event data comprises extracting further information from the raw event data. For example, enriching the event data includes, but is not limited to the following: determining whether the event data was produced by a user or a robot/spider based on an internet protocol (IP) address and user agent of the data producer 5; parsing and attaching user agent information to the event data; and converting values of all transactions in the event data to a specified currency using an open exchange rate application programming interface (API). Where additional data is required to enrich the event data, the streaming platform 10 can utilise a first-party streaming platform 70 and/or a third-party streaming platform 80 to enrich the event data. For example, when enriching the event data to convert values of transactions in the event data to a specified currency, a third-party open exchange rate database can be accessed using an API to convert the values of transactions in the event data.

The streaming platform 10 send the event data to the data loader 20. The streaming platform 10 can send the event data as a batch of event data. The batch of event data corresponds to a plurality of events at the data producer 5. The streaming platform 10 can send a plurality of batches of events to the data loader 20 over a period of time.

The data loader 20 can transform and/or process the event data. This includes, but is not limited to, processing the event data to determine a schema of the event data. This includes, but is not limited to, transforming the event data to a specific data format, such as tab-separated values (TSV) or JavaScript Object Notation (JSON).

The streaming platform 10 can send the event data to the data loader 20 in real time. The streaming platform 10 can send the event data to the data loader 20 via a real-time stream. Example real-time streams include, but are not limited to, Kinesis on Amazon Web Services and PubSub on Google Cloud Platform.

The data loader 20 can load the event data to another data storage. In the illustrated embodiment, the data storage is an object storage 30. The object storage 30 can be a cloud object store. The skilled person would understand that a data loader 20 is capable of loading event data to other types of data storages. Other types of data storage include, but are not limited to, data warehouses and data lakes.

Once the event data is loaded into the object storage 30, the data warehouse 40 read the event data stored in the object storage. Optionally, when the event data is loaded into the object storage 30 by the data loader 20, the data loader 20 can instruct the data warehouse 40 to read the event data from the object storage 30 by sending a control command. The control command can be a structured query language (SQL) command. Alternatively, the data warehouse 40 may read the event data from the object storage 30 on its own accord.

The data warehouse 40 can forward the event data copied from the object storage 30 to data applications 50. A user of the data applications 50 may use the event data for subsequent analysis or modelling of the event data. The data warehouse 40 can process and/or transform the event data copied from the object storage 30 such that the event data is suitable for use with the data applications 50. Example data applications 50 include, but are not limited to, business intelligence tools, machine learning models, real-time dashboards, marketing automation, recommendation system, anomaly detection, and product analytics.

It is noted that all statements made with respect to "event data" in the detailed description is also applicable to a batch of event data and a plurality of batches of event data. For example, when the description mentions that the data loader 20 can transform and/or process the event data, this also includes the data loader 20 being able to transform and/or process a batch of event data and a plurality of batches of event data.

Figure 2A:
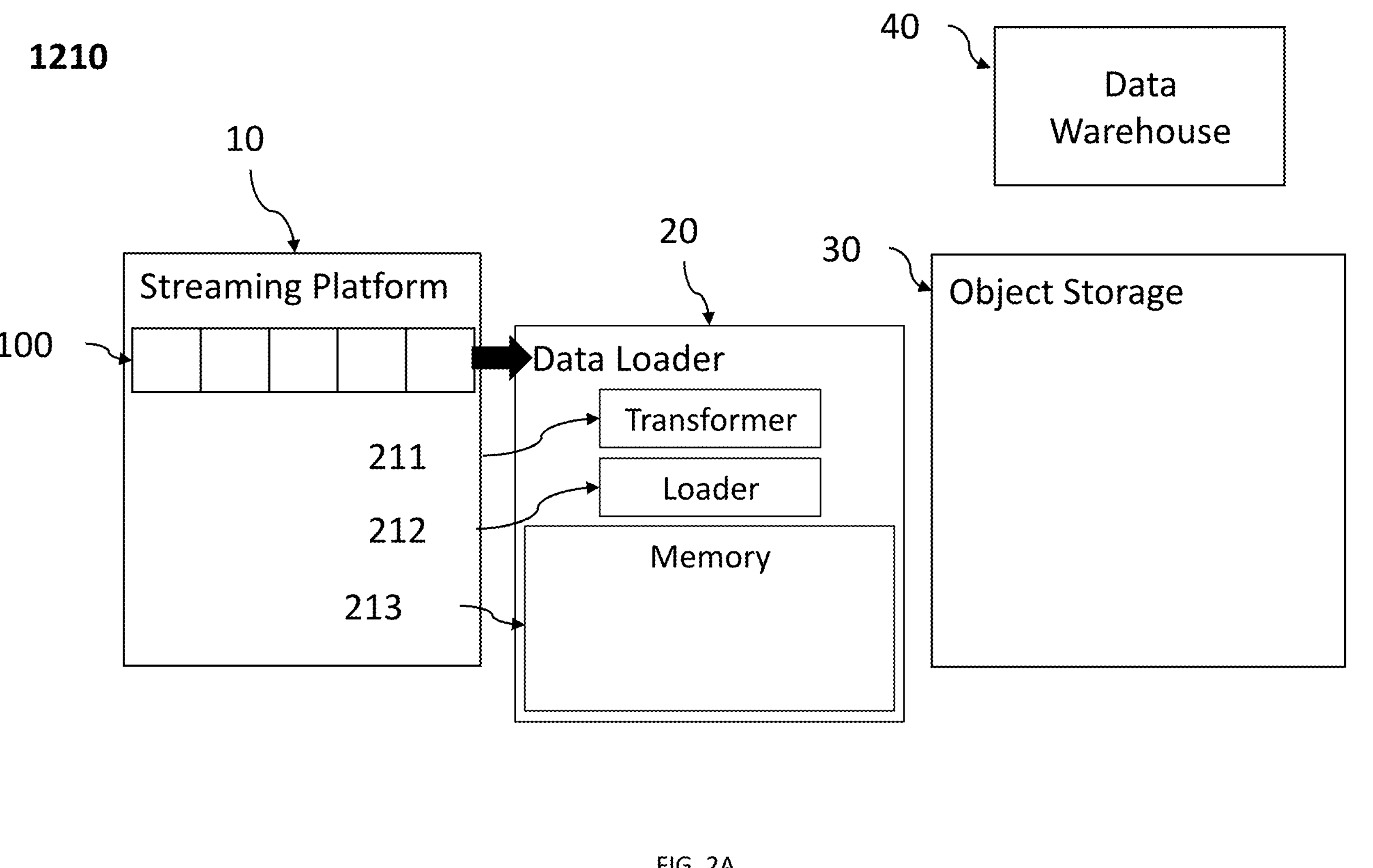
FIGS. 2A-2C show a first system 1210 for storing event data 100, the system 1100 comprises a streaming platform 10, an object storage 30, a data warehouse 40 and a data loader 20 for loading event data 100 from the streaming platform 10 to the object storage 30.
Figure 2B:
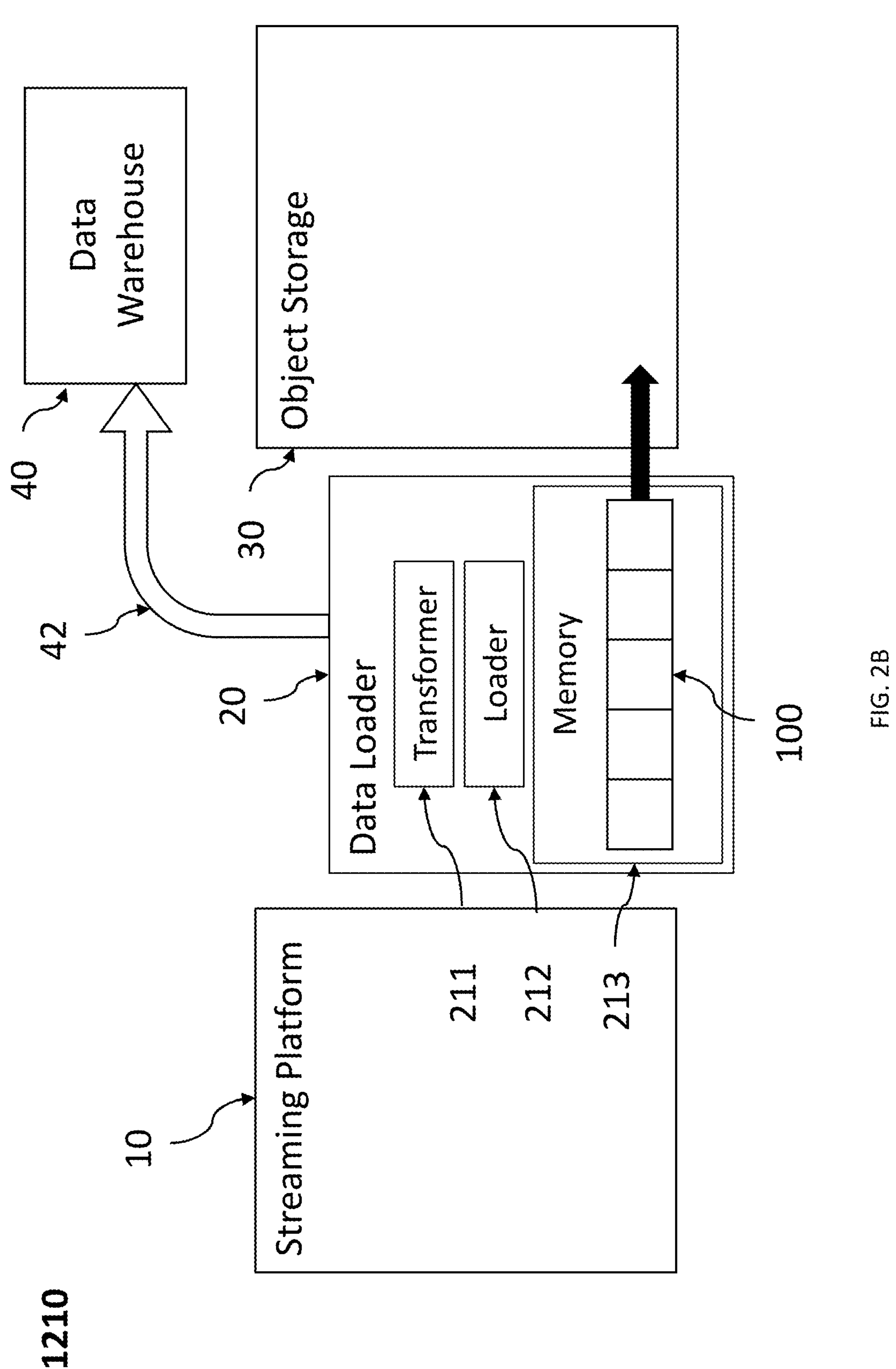
Figure 2C:
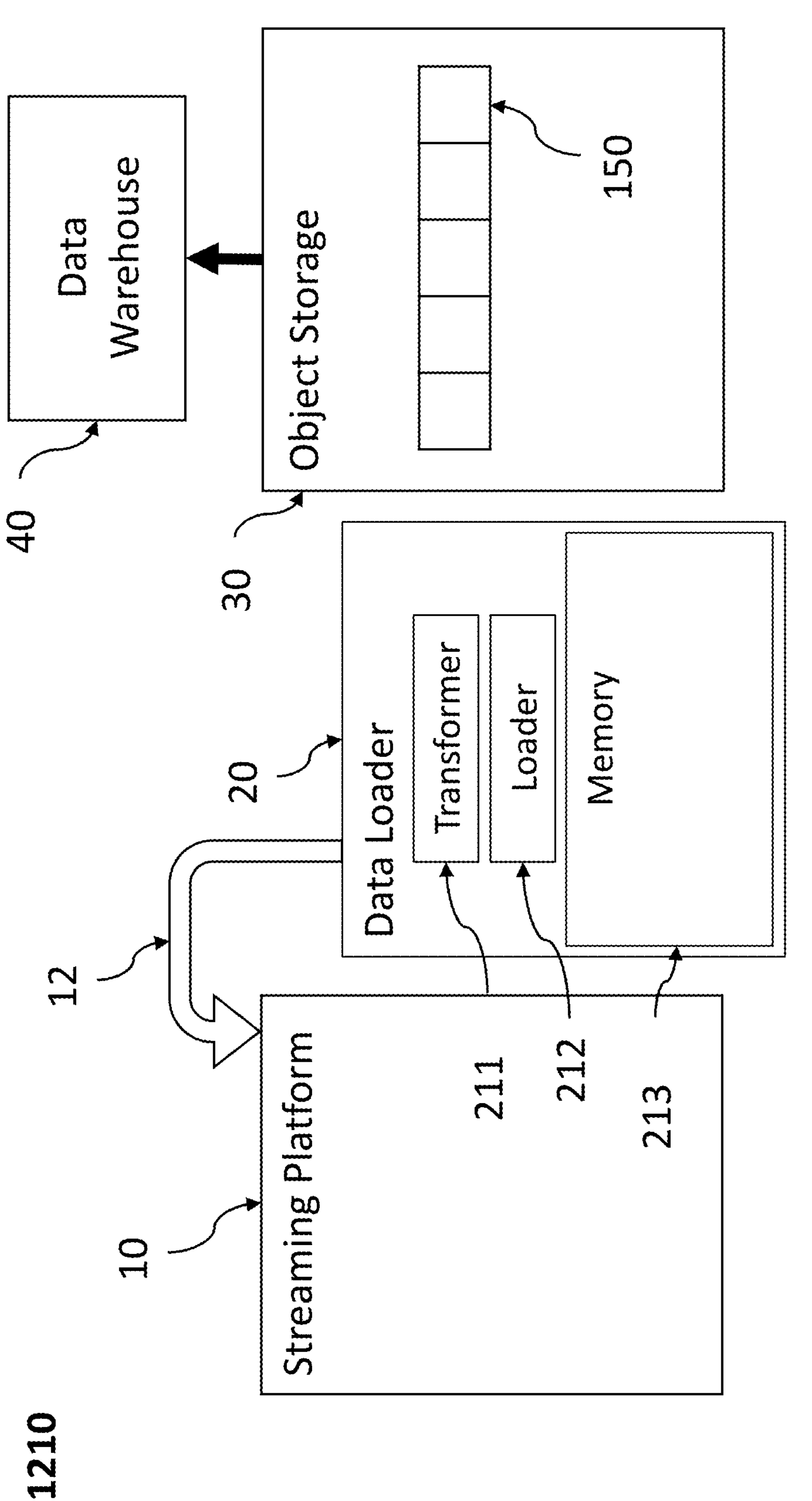

FIGS. 2A-2C show a first system 1210 for storing event data 100, the system 1100 comprises a streaming platform 10, an object storage 30, a data warehouse 40 and a data loader 20 for loading event data 100 from the streaming platform 10 to the object storage 30.

The streaming platform 10 generates event data 100 in response to a user interacting with the data producer 5 in communication with the streaming platform 10. The data producer 5 sends information relating to events that have occurred on the data producer 5 to the streaming platform 10. For example, if the data producer 5 is a web page, example events include, but are not limited to, loading the web page, adding an item to a basket in the web page, entering a destination on the web page, checking a user balance on the web page, searching for an item on the web page, and sharing a video on the web page.

In response to the streaming platform 10 receiving the event data 100 from the data producer 5, the event data 100 is sent from the streaming platform 10 to the data loader 20. In the illustrated embodiment, the streaming platform 10 sends a batch of event data 100. In the illustrated embodiment, the streaming platform 10 sends a batch of five event data 100 objects.

The streaming platform 10 can be a streaming platform. Streaming platforms 10 include, but are not limited to, the following: Apache Kafka; Amazon Kinesis; and Google Cloud Pub/Sub. The skilled person would understand that event data 100 can be received using alternative streaming platforms 10 or streaming platforms.

The data loader 20 comprises a transformer 211, a loader 212, and a memory 213. A data processor of the data loader 20 executes the functions of the transformer 211 and the loader 212. The transformer 211 is configured to receive the batch of event data 100 from the streaming platform 10. The transformer 211 can receive the batch of event data 100 from the streaming platform 10 in real time.

The transformer 211 can transform a format of the event data 100. The format of the event data 100 can be a JavaScript Object Notation (JSON) file. Another format of the event data 100 can be a tab separated value (TSV) format. The skilled person would understand that the event data 100 could be generated using alternative file formats.

The memory 213 can store event data 100. Specifically, the memory 213 can cache the event data 100 from the streaming platform 10. The memory 213 can cache a batch of event data 100 received from the streaming platform 10. The transformer 211 can generate an output file 150 comprising the batch of event data 100 cached in the memory 213.

The loader 212 can load the output file 150 generated by the transformer 211 to the object storage 30. The loader can also send a control command 42 to the data warehouse 40 to copy the output file 150 loaded to the object storage 30. The control command 42 can be a SQL command.

The data processor of the data loader 20 can process the event data 100. The data processor of the data loader 20 can dynamically determine a schema type of the received event data 100 to adapt to the change in schema of the event data 100. A schema defines how data is structured in the event data 100. For example, the schema can define the fields (e.g. event date and name) of the event data 100 and the type of variable (e.g. string, integer, binary) used for each field.

To dynamically determine the schema type of an event data 100, the data loader 20 holds a batch of event data 100 in memory of the data loader 20. The schema type of the event data 100 can be determined dynamically because the event data 100 are self-describing. The event data 100 can be stored as a table in the data warehouse 40. Columns of the table in the data warehouse 40 are created based on the self-describing schema of the event data 100 and the nature of the data producers 5 that generate the event data 100. The columns can be adapted based on changes in the content of the event data 100. The size, nature and name of the columns can be adapted based on changes in the content of the event data 100.

The data loader 20 can return an acknowledgement message 18 to the streaming platform 10 in response to receiving the event data 100 from the streaming platform. The data loader 20 can be configured to only return the acknowledgement message if all the event data 100 has been received by the data loader 20 and also successfully loaded to the object storage 30.

Once the event data 100 has been successfully loaded to the object storage 30, a data warehouse 40 can read and/or write the event data 100 stored in the object storage 30 as the output file 150. The data warehouse 40 can for example copy the output file 150 into a data application 50.

In FIG. 2A, the streaming platform 10 sends a batch of event data 100 to the data loader 20. The transformer of the data loader 20 receives the batch of event data 100 from the streaming platform 10, for example via a real-time event data stream.

In FIG. 2B, the data processor of the data loader 20 caches the event data 100 in the memory 213. Optionally, the data processor of the data loader 20 can process the event data 100 whilst in the memory 213. Optionally, the transformer 211 can transform the event data 100 whilst in the memory 213. The loader 212 can then subsequently load the event data 100 into the object storage 30 as an output file 150. Simultaneously, or soon thereafter, the loader 212 can optionally send a control command 42 to the data warehouse 40 instructing the data warehouse 40 to copy the output file 150 stored in the object storage 30.

In FIG. 2C, the output file 150 has been successfully loaded to the object storage 30. Optionally, the output file 150 is flushed from the memory 213 to the object storage 30.

The data warehouse 40 copies the event data 100, now stored as an output file 150 from the data loader 20. The data loader 20 sends an acknowledgement message 20 back to the streaming platform 10 to notify that all the event data 100 has been loaded to the object storage 30.

It is noted that size of the output file 150 loaded to the object storage 30 is limited by the size of the memory 213 of the data loader 20. This is a problem because the size of the output file 150 may not be large enough to facilitate efficient queries of event data 100 in the object storage 30.

The data loader 20 of the system 1100 does not determine a metadata of the event data 100. Metadata of an event data 100 includes, but is not limited to, a table history of event data 100 added to the object store 30, a current schema determined by the data loader 20, and file level statistics of the event data 100.

Figure 3:
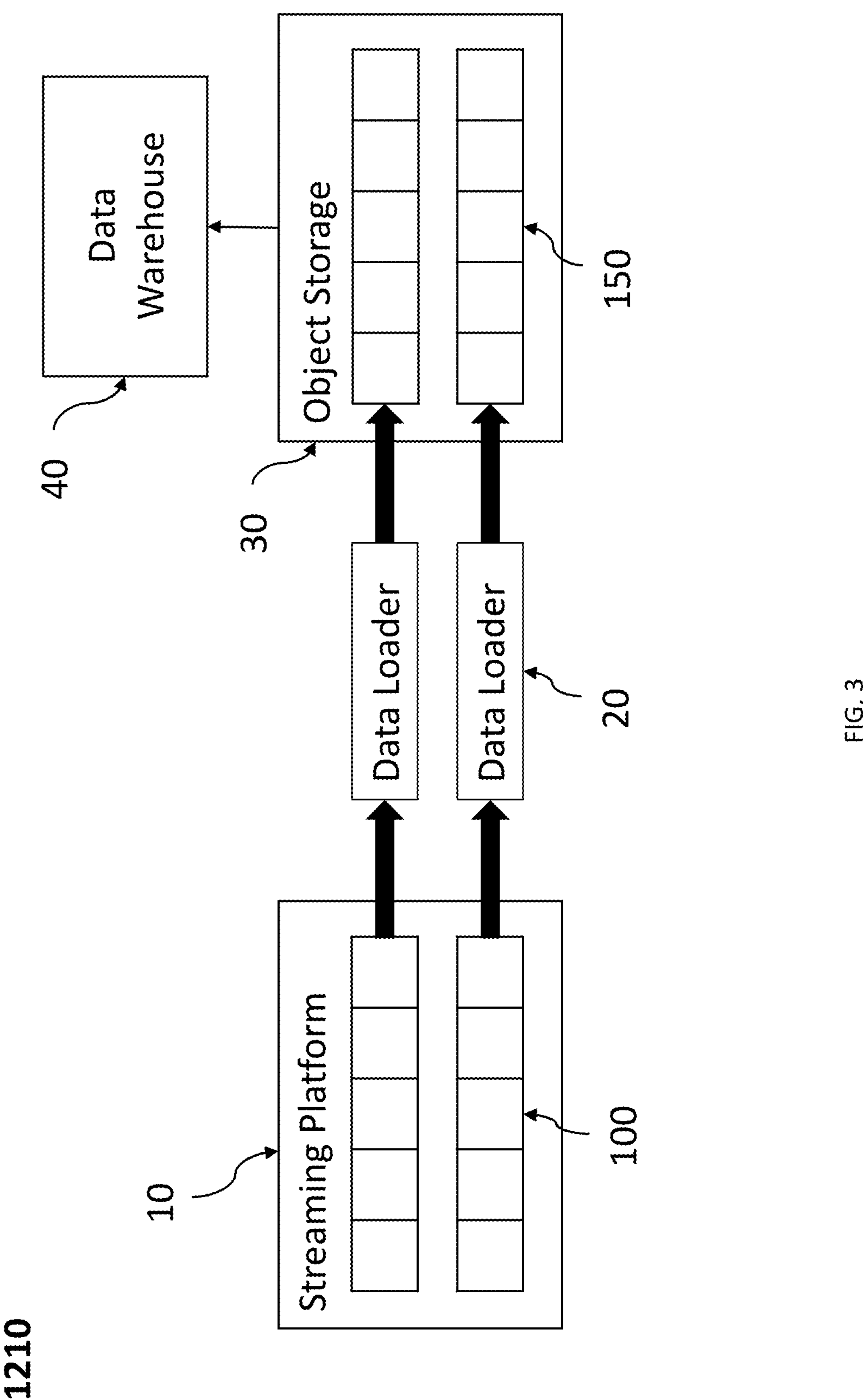
FIG. 3 shows the first system 1210 for storing event data 100, the system 1100 further comprises a plurality of data loaders 20 for loading event data 100 from the streaming platform 10 to the object storage 30.

FIG. 3 shows the first system 1210 for storing event data 100, the system 1100 further comprises a plurality of data loaders 20 for loading event data 100 from the streaming platform 10 to the object storage 30.

The system 1210 can comprise a plurality of data loaders 20. The streaming platform 10 can send event data 100 to the plurality of data loaders 20. The streaming platform 10 manages the distribution of event data 100 between the plurality of data loaders 20. Each of the plurality of data loaders 20 can receive event data 100 from a respective plurality of event data 100 streams in the streaming platform 10. The plurality of event data 100 streams can be independent of each other. For example, each event data 100 stream of the streaming platform 10 can be configured to receive event data 100 from different data producers 5. Additionally, each event data 100 stream may not share event data 100 with each other and each data loader 20 also may not share event data 100 with each other.

Advantageously, the system 1210 allows horizontal scaling. The system 1210 can increase the number of data loader 20 in response to an increase in the amount of event data 100 at the streaming platform 10.

FIG. 4 shows a table summarising characteristics of the first system 1210 for storing event data 100. The output file size of the data loader 20 is limited by the size of the memory 213 of the data loader 20. However, utilizing the memory 213 of the data loader 20 to cache a batch of event data 100 enables the schema of the event data 100 to be dynamically determined. The output file 150 of the data loader 20 does not comprise metadata of the event data 100. The data loader 20 can be horizontally scaled in response to changes in size of the event data 100. The data loader 20 can be horizontally scaled by increasing the number of data loaders 20 receiving event data 100 from the streaming platform 10.

Figure 5:
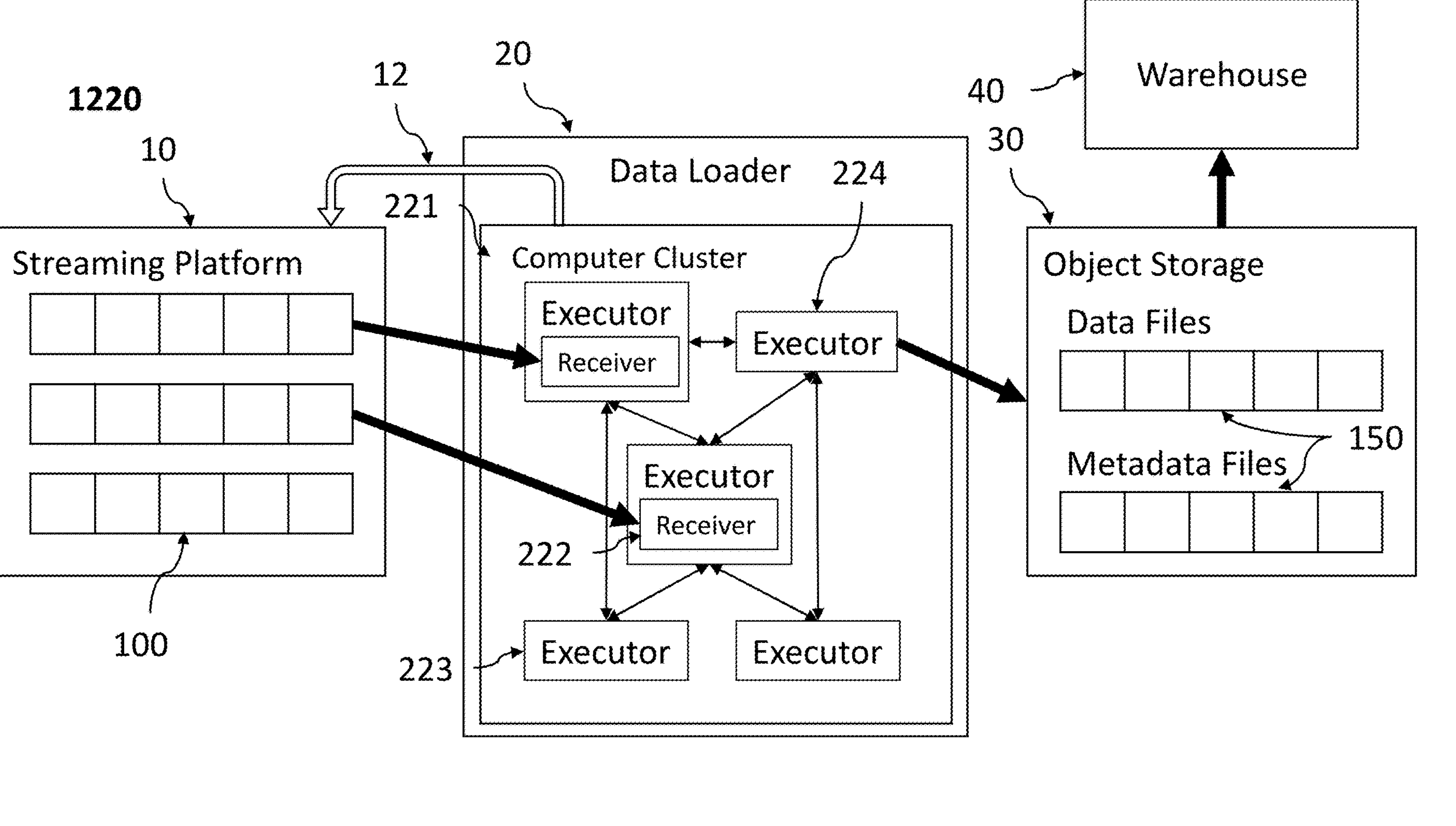
FIG. 5 shows a second system 1220 for storing event data 100, the system 1100 comprises a streaming platform 10, an object storage 30, a data warehouse 40 and a data loader 20 for loading event data 100 from the streaming platform 10 to the object storage 30.

FIG. 5 shows a second system 1220 for storing event data 100, the system 1100 comprises a streaming platform 10, an object storage 30, a data warehouse 40 and a data loader 20 for loading event data 100 from the streaming platform 10 to the object storage 30. For simplicity, only the differences between the second system 1220 and the first system 1210 are described.

In contrast to the first system 1210, the data processor of the data loader 300 comprises a cluster of computer nodes 221. The cluster of computer nodes 221 are configured to receive event data 100 from the streaming platform 10. The cluster of computer nodes 221 are configured to process the event data 100. The cluster of computer nodes 221 are configured to transform the event data 100. The cluster of computer nodes 221 are configured to load the event data 100 received from the streaming platform 10 to the object storage 30.

The cluster of computer nodes 221 comprise a receiver node 222 for receiving the event data 100 from the streaming platform 10. Any of the computer nodes from the cluster can be a receiver node 222. The receiver node 222 is in communication with the streaming platform 10 and can receive the event data 100 from an event stream of the streaming platform 10.

The receiver node 222 can receive a batch of event data 100. The size of the batch of event data can correspond to a number of events captured by the streaming platform during a predetermined time period. Advantageously, the cluster of computer nodes 221 can dynamically determine a schema of the event data 100 based on the batch of event data 100. The cluster of computer nodes can dynamically determine the schema by determining the schema of each batch of event data 100 corresponding to each of their predetermined time period.

The receiver node 222 is configured to distribute the event data 100 across the plurality of computer nodes amongst the cluster of computer nodes 221. Advantageously, distributing the event data 100 across the cluster of computer nodes 221 allows the event data 100 to be processed and/or transformed in parallel by the cluster of computer nodes 221. Parallel processing and/or transformation of the event data 100 improves the throughput of the data loader 20.

The cluster of computer nodes 221 comprise a driver node configured to schedule processing and/or transformation of the event data 100 from the streaming platform 10 amongst the cluster of computer nodes 221. Any of the computer nodes from the cluster can be a driver node. A computer node from the cluster can be a receiver node 222 and a driver node. The driver node can determine the order of processing and/or transformation of the event data 100 by the cluster of computer nodes 221.

The cluster of computer nodes 221 comprise an executor node 223, wherein the executor node 223 is configured to process the event data 100 from the streaming platform 10. The executor node 223 is also configured to transform the event data 100 from the streaming platform 10. Any of the computer nodes from the cluster can be an executor node 223. A computer node from the cluster of computer nodes 221 can be a receiver node 222, an executor node 223 and a driver node. Advantageously, the cluster of computer nodes 221 comprising a plurality of executor nodes 223 allows larger amounts of event data 100 to be processed and/or transformed by sharing the event data 100 between the computer nodes of the cluster.

Once the executor nodes 223 finish processing and transforming the event data 100, the processed and/or transformed event data 100 is aggregated at an output executor node 224. The output executor node 224 is configured to load the processed and/or transformed event data 100 to the object storage 30. Advantageously, a larger amount of event data 100 can be processed for each loading process of the event data 100 to the object storage 30.

The cluster of computer nodes 221 can be an Apache Spark Cluster. Advantageously, the Apache Spark Cluster determines the metadata of the event data 100.

Metadata of the event data 100 includes, but is not limited to, a table history of event data 100 added to the object store 30, a current schema determined by the data loader 20, and file level statistics of the event data 100.

In response to an increase in size of the event data 100, the cluster of computer nodes 221 can increase the number of executor nodes 223 to accommodate for the increase in processing and/or transformation requirements imposed by the increased size of event data 100. This is a problem because connecting and disconnecting computer nodes to the cluster is time consuming and therefore not adequately responsive to changes in size of the event data 100.

FIG. 6 shows a table summarising characteristics of the second system 1220 for storing event data 100. The size of the output file 150 is the total size of the event data 100 aggregated at a computer node of the cluster of computer nodes 221. Aggregating the event data 100 enables a large output file 150 to be loaded to the object storage 30. A larger output file size facilitates more efficient event data 100 querying at the object storage 30 and reduces the frequency of computations associated with event data transformation. For example, the frequency of the data loader 20 committing to transforming the event data into an Iceberg or Delta format. However, the use of computer clusters 221 to aggregate the event data 100 compromises scaling. The output file type of the data loader 300 is an Iceberg or Delta file and therefore metadata and data files are both included in the output file 150 loaded into the object storage 30. The dynamic schema of the data loader 300 is enabled by buffering a batch of event data 100 in the memory of an executor node 223. The data loader 20 requires additional executor nodes 223 in the cluster to accommodate for increase in the size of the event data 100. Adding additional computer nodes to the cluster is inefficient and costly, therefore the data loader 300 cannot be easily scaled in response to changes in size of the event data 100.

Figure 7:
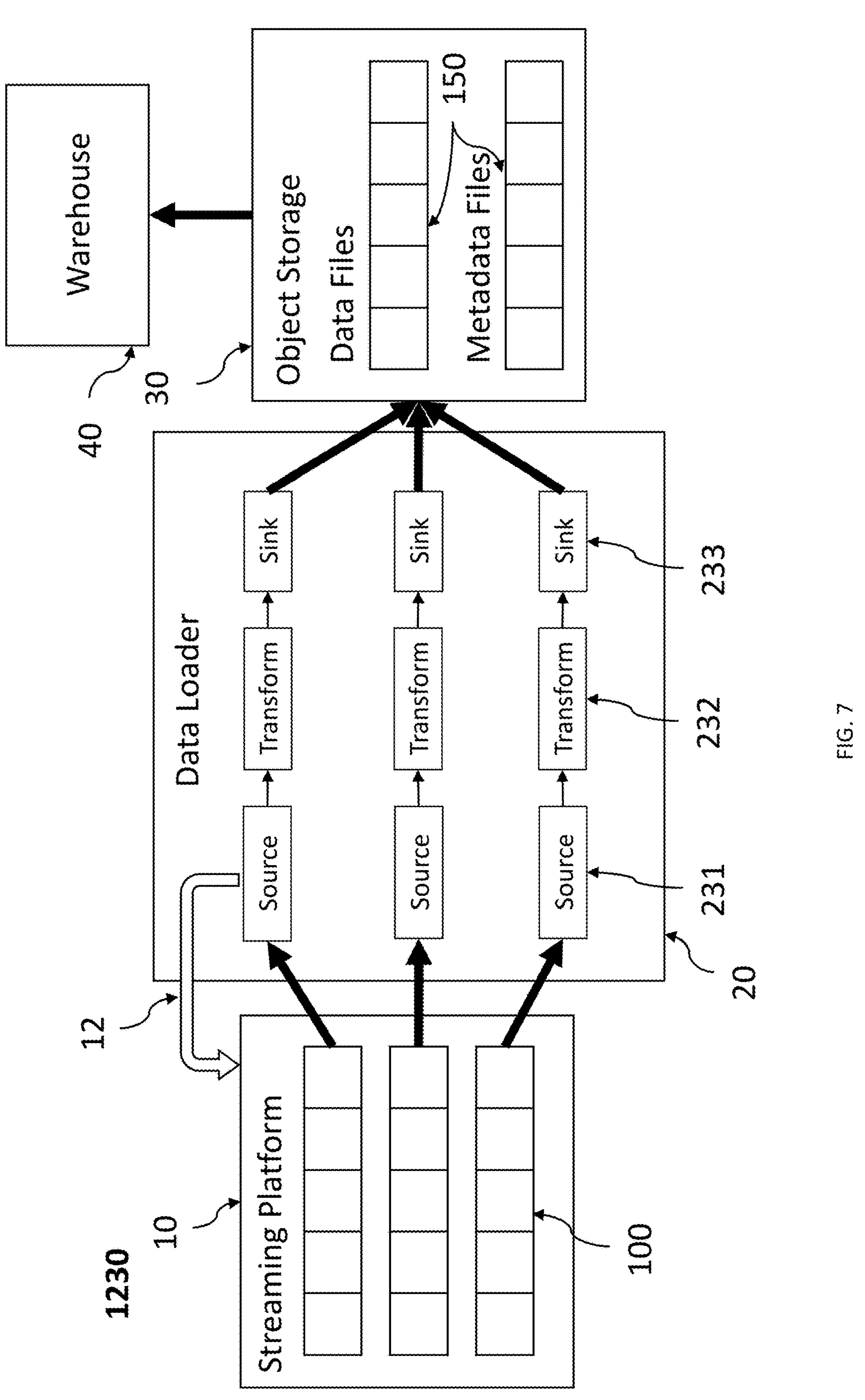
FIG. 7 shows a third system 1230 for storing event data 100, the system 1100 comprises a streaming platform 10, an object storage 30, a data warehouse 40 and a data loader 20 for loading event data 100 from the streaming platform 10 to the object storage 30.

FIG. 7 shows a third system 1230 for storing event data 100, the system 1100 comprises a streaming platform 10, an object storage 30, a data warehouse 40 and a data loader 20 for loading event data 100 from the streaming platform 10 to the object storage 30. For simplicity, only the differences between the third system 1230 and the first and second systems 1210, 1220 are described.

The data loader 20 of the third system 1230 comprises a set of parallel computer nodes. Each computer node comprises a source node 231, a transform node 232, and a sink node 233. The source node 231 is configured to receive the event data 100 from an event stream of the streaming platform 10. The transform node 232 is configured to transform the event data 100 received from the streaming platform 10. The sink node 233 is configured to load the transformed event data 100 to the object store 30. The data loader 20 can be for example Apache Flink.

Advantageously, the system 1230 allows horizontal scaling. The system 1500 can increase the number of parallel computer nodes 510 in response to an increase in the amount of event data 100 at the streaming platform 10.

It is noted that the data loader 20 requires the schema of the event data 100 to be initialized before loading to the object storage 30. This is a problem because the schema of event data 100 cannot be dynamically determined in response to the contents of the event data 100.

FIG. 8 shows a table summarising characteristics of the third system 1230 for storing event data 100. The output file 150 is generated by directly streaming the event data 100 from the streaming platform 10 through the parallel computer nodes. However, the use of direct streaming without any caching prevents dynamic schema determination. This is because the event data 100 is not buffered in memory for the data loader 20 to analyse the contents of a batch of event data 100 to determine its schema and/or metadata. Furthermore, because the event data 100 is not cached or aggregated, the data loader 20 has to frequently commit to transforming the event data 100 into an Iceberg or Delta format. Accordingly, the data loader 20 inefficiently loads event data 100. Specifically, the ratio of the size of event data 100 loaded to the object storage 30 to the computation required to transform the event data 100 to an Iceberg or Delta format is low. The system 1230 can add additional data loaders 20 to accommodate for increases in size of the event data 100.

FIGS. 9A-9E show a fourth system 1240 for storing event data 100, the system 1240 comprises a streaming platform 10, an object storage 30, a data warehouse 40 and a data loader 20 for loading event data 100 from the streaming platform 10 to the object storage 30. For simplicity, only the differences between the fourth system 1230 and the first, second and third systems 1210, 1220, 1230 are described.

The data loader 20 of the fourth system 1240 comprises a data processor. The data processor can be a computer node running in local mode. The computer node can execute the processes of the transformer 211. The local computer node can be embedded in the data loader 20. The data loader 20 further comprises a local file system 240.

The local computer node can be the transformer 211. Similar to the data loader 20 of FIG. 5, the transformer 211 can be at least one of an receiver node 222, an executor node 223 and an output node. The transformer 211 can be an Apache Spark Cluster comprising a single local computer node. Advantageously, the Apache Spark Cluster determines the metadata of the event data 100.

The data loader 20 receives the event data 100 from the streaming platform 10. The data loader 20 can process and/or transform the event data 100 from the streaming platform 10 with the local computer node.

The local computer also caches the batch of event data 100 to the memory 213. Subsequently, in contrast to the data loader 20 of FIGS. 2-3, the local computer writes the event data 100 to the local file system 240. The local file system 240 stores the event data 100 in memory until the event data 100 is loaded by the data loader 20 from the local file system 240 to the object storage 30.

The batch of event data is buffered in the local file system 240. Advantageously, the local computer can dynamically determine a schema of the event data 100 based on the batch of event data 100. The local computer can dynamically determine the schema by determining the schema of each batch of event data 100.

The local computer can receive, process and transform a plurality of batches of event data 100. The local computer can write the plurality of batches of event data 100 to the local file system 240. Accordingly, the local file system 240 can store a plurality of batches of event data 100.

The event data 100 can be processed and/or transformed by the local computer. The local computer can periodically load a portion of a batch of event data 100 from the plurality of batches of event data 100 according to a predetermined time interval. For example, every five minutes, the local computer can load one batch of event data 100 from the plurality of batches of event data 100 stored in the local file system 240 to the object storage 30. Advantageously, the size of the event data 100 loaded to the local file system 240 is dependent on the memory size of the local file system 240. This allows a significantly larger output file 150 to be generated and buffered in the local field system 240 and subsequently loaded to the object storage 30. A larger output file in the object storage 30 facilitates more efficient querying by the data warehouse 40.

In contrast to the data loader 300 of FIG. 3, once the local computer finishes processing and transforming the event data 100, the processed and/or transformed event data 100 is aggregated at the local file system 240. The local computer is configured to load the processed and/or transformed event data 100 stored in the local file system 240 to the object storage 30. Advantageously, a larger amount of event data 100 can be processed for each loading phase of the event data 100 to the object storage 30. This further reduces the time spent by the data loader 20 on committing the event data 100 to be transformed into a specific format per loading, such as Iceberg or Delta. Specifically, the frequency of commits to transforming the event data 100 to the Iceberg or Delta formats is reduced.

The local computer can determine a metadata of the event data. For example, the local computer can calculate file-level statistics. In another example, the local computer can partition the event data 100 by fields. Fields of the event data 100 includes, but is not limited to date of the event, and name of the event.

Advantageously, the system 1700 allows memory scaling. The system 1700 can increase the memory capacity of the local file system 240 in response to an increase in the amount of event data 100 at the streaming platform 10.

Figure 9A:
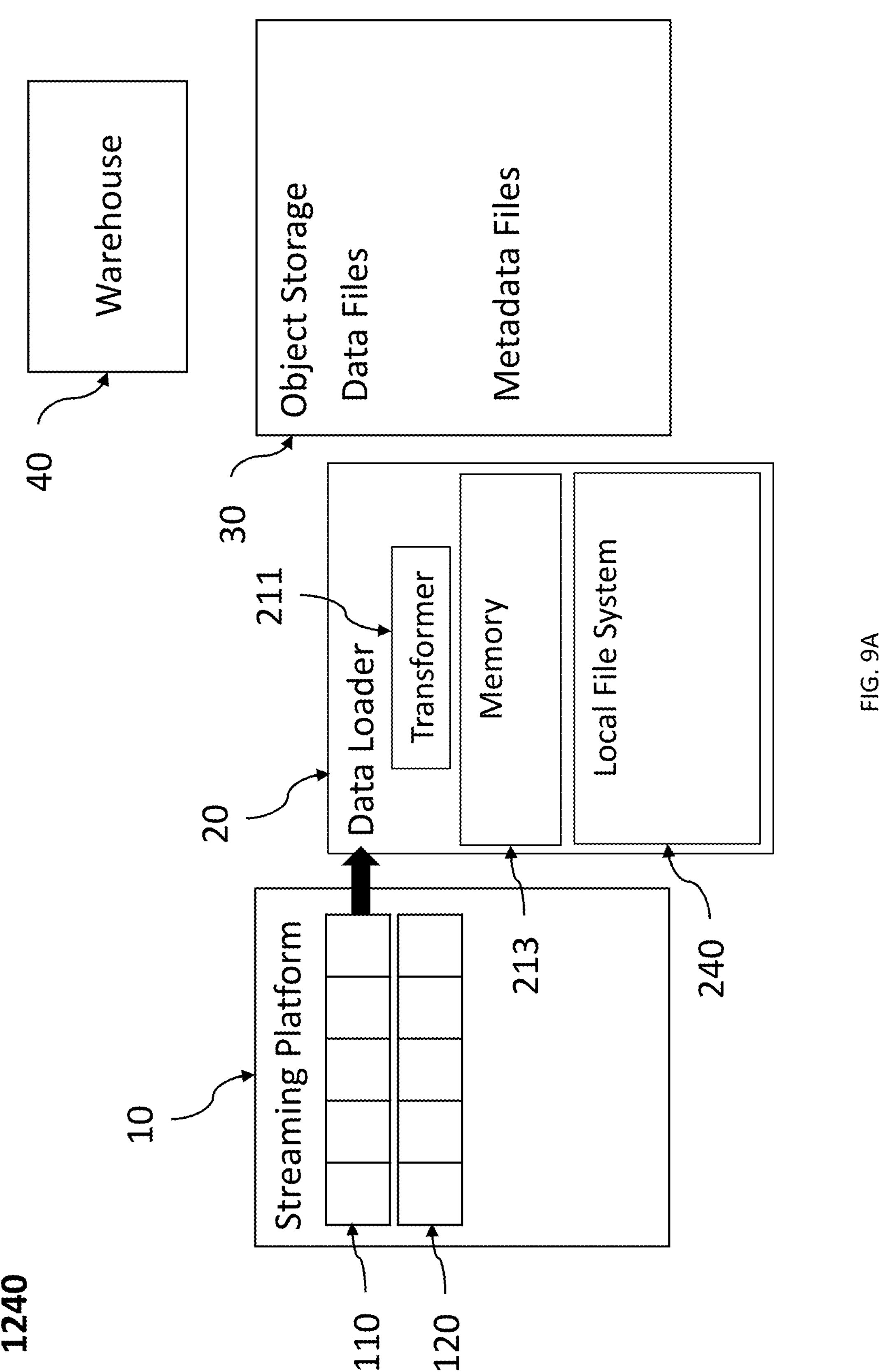
FIGS. 9A-9E show a fourth system 1240 for storing event data 100, the system 1240 comprises a streaming platform 10, an object storage 30, a data warehouse 40 and a data loader 20 for loading event data 100 from the streaming platform 10 to the object storage 30.

A worked example of the fourth system 1240 for storing event data 100 is described with reference to FIGS. 9A-9E. In FIG. 9A, the streaming platform 10 has a first batch of event data 110 and a second batch of event data 120. The first batch of event data 110 and the second batch of event data 120 can be from separate event streams of the streaming platform 10. Alternatively, the first batch of event data 110 and the second batch of event data 120 can from the same event stream of the streaming platform 10. The streaming platform 10 sends the first batch of event data 110 to the data loader 20. The streaming platform 10 can send the first batch of event data 110 via a real-time event data stream.

Figure 9B:
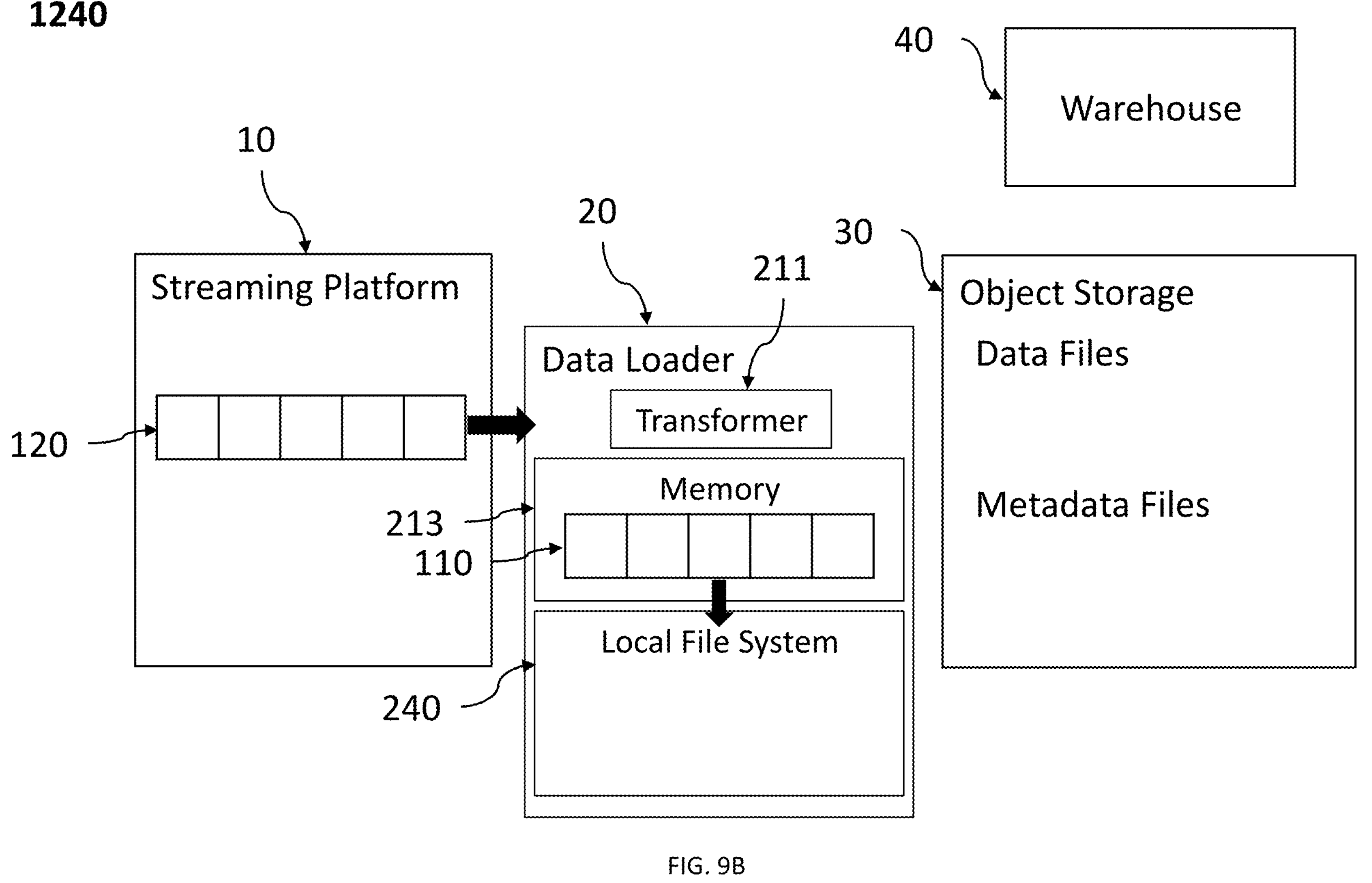

In FIG. 9B, the data loader 20 receives the first batch of event data 110. A data processor of the data loader 20 can receive the first batch of event data 110. Specifically, the transformer 211 of the data loader 20 can receive the first batch of event data 110. The data processor of the data loader 20 then caches the first batch of event data 110 to the memory 213 of the data loader 20.

Once the data loader 20 has been cached in the memory 213, the data processor of the data loader writes first batch of event data 110 to the local file system 240. The data processor can write the batch of event data from the memory 213 to the local file system 240 when the memory capacity is full. Alternatively, or in addition, the data processor can periodically write the batch of event data from the memory 213 to the local file system 240 according to a predetermined time interval. Optionally, the data processor can flush the first batch of event data 110 from the memory 213 to the local file system 240, i.e. the data processor can delete the first batch of event data 110 from the memory 213 after the first batch of event data 110 has been written to the local file system 240.

In the meantime, The streaming platform 10 sends the second batch of event data 120 to the data loader 20. The streaming platform 10 can also send the second batch of event data 120 via a real-time event data stream.

Figure 9C:
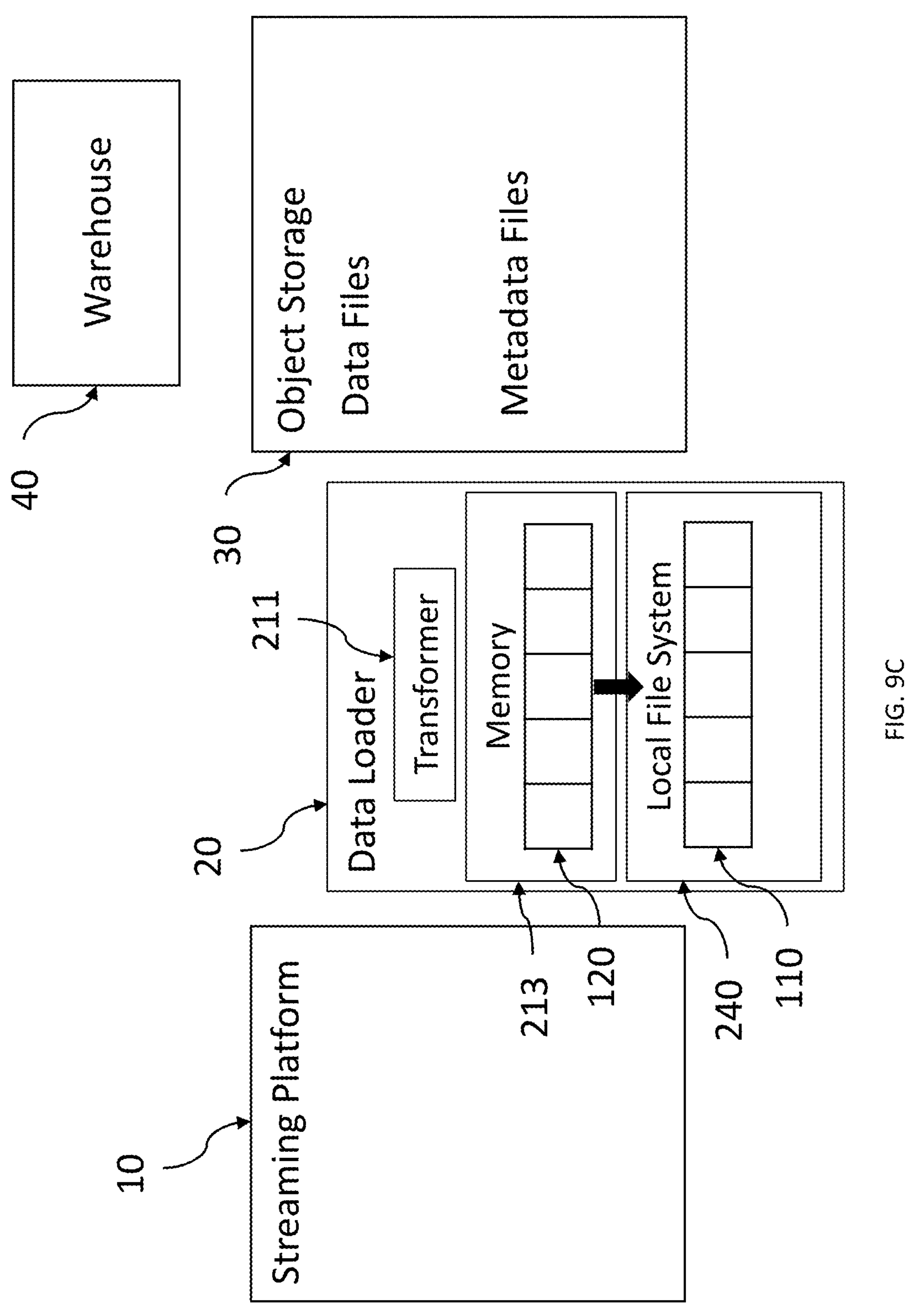

In FIG. 9C, the first batch of event data 110 has been stored in the local file system 240. The local file system 240 has a larger memory capacity than the memory 213 of the data loader 20. Therefore, a larger output file can be generated in the local file system 240 than the memory 213 of the data loader 20.

The data loader 20 receives the second batch of event data 120. The data processor of the data loader 20 can receive the second batch of event data 120. Specifically, the transformer 211 of the data loader 20 can receive the second batch of event data 120. The data processor of the data loader 20 then caches the second batch of event data 120 to the memory 213 of the data loader 20.

Once the data loader 20 has been cached in the memory 213, the data processor of the data loader writes second batch of event data 120 to the local file system 240. Optionally, the data processor can flush the second batch of event data 120 from the memory 213 to the local file system 240, i.e. the data processor can delete the second batch of event data 120 from the memory 213 after the second batch of event data 120 has been written to the local file system 240.

Figure 9D:
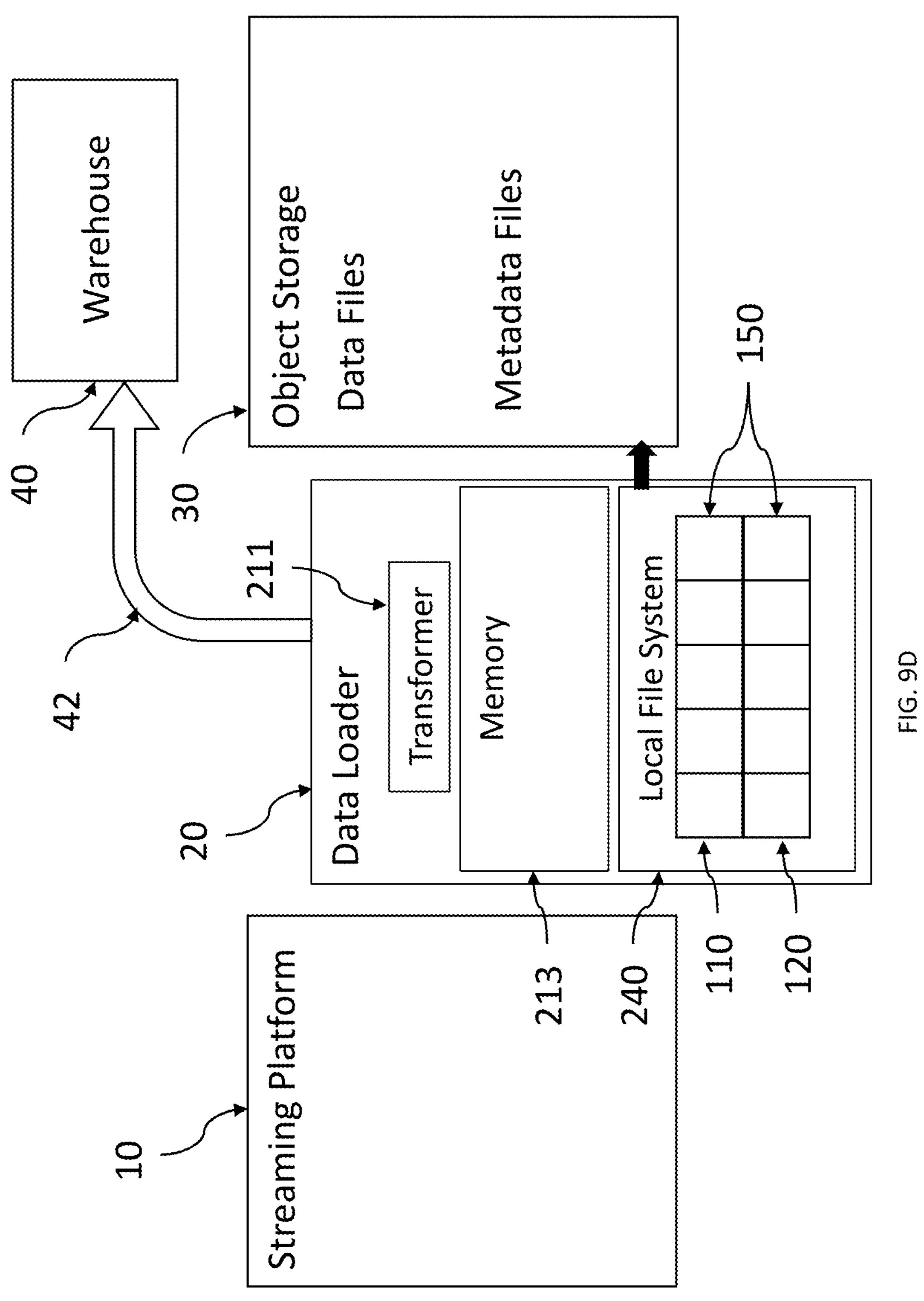
Figure 9E:
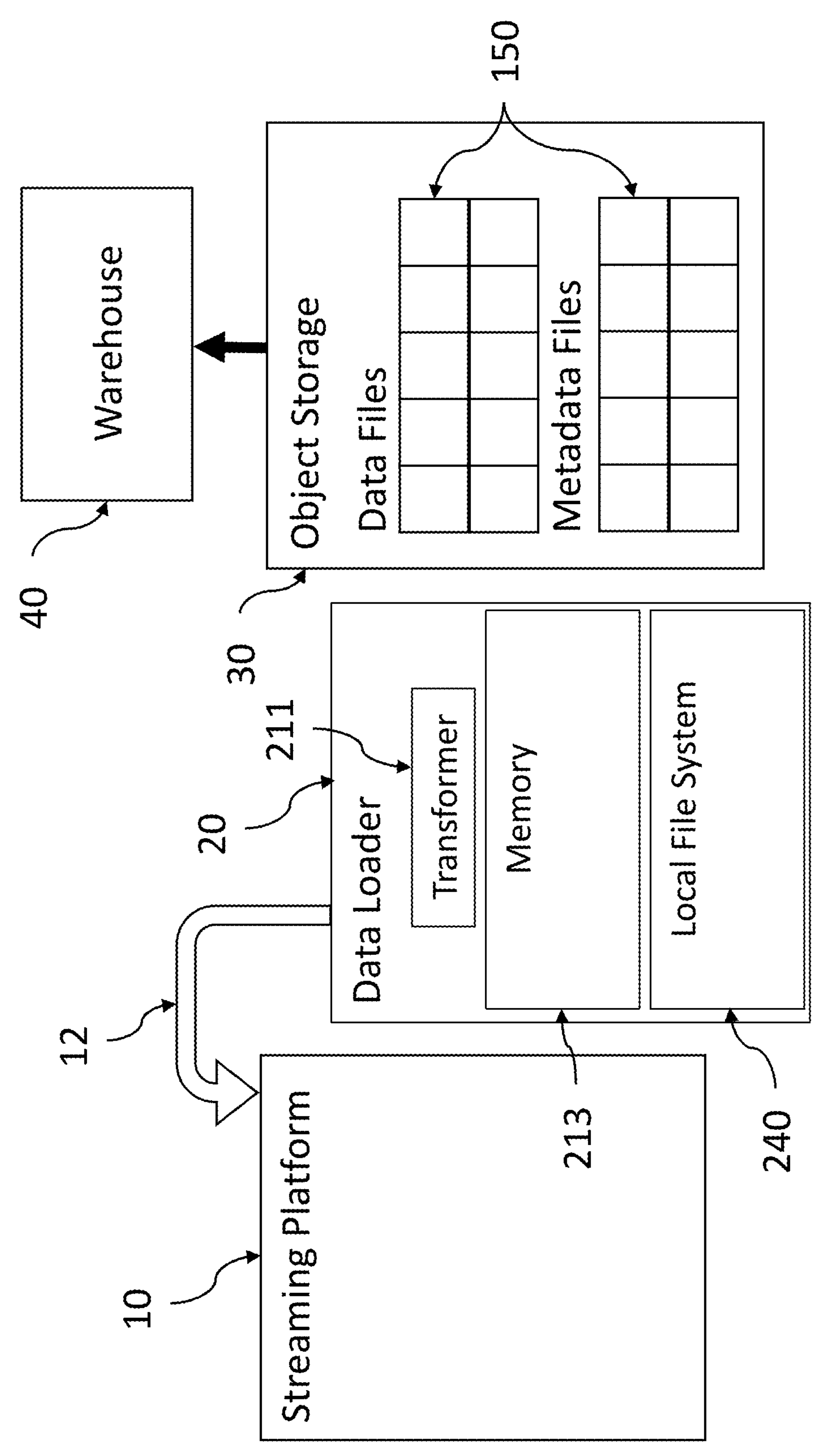

In FIG. 9D, both the first batch of event data 110 and the second batch of event data 120 are stored in the local file system. The data processor can process the plurality of batches of event data received from stream platform 10 and now stored in the local file system 240. Processing the plurality of batches of event data comprises dynamically determining the schema of the plurality of batches of event data. Processing the plurality of batches of event data further comprises determining a metadata of plurality of batches of event data, wherein the metadata comprises at least one of the following: history of event data added to the object storage 30; a current schema of the data loader 20; and file level statistics of the event data 100.

The data processor combines the first batch of event data 110 and the second batch of event data 120 into an output file 150. The data processor can periodically combine a plurality of the batches of event data according to a predetermined combining time interval. The predetermined combining time interval can be, for example, five minutes.

As mentioned before, the transformer 211 that is run by the data processor can be an Apache Spark Cluster comprising a single local computer node. Advantageously, the Apache Spark Cluster can combine the plurality of batch of event data 100 into an output file 150, wherein the output file 150 is a resilient distributed dataset (RDD). RDD is an immutable distributed collection of objects. Accordingly, the Apache Spark Cluster can create an immutable distributed collection of the plurality of batch of event data 100 by combining the plurality of batches of event data 100 according to a predetermined combining time interval.

The data processor can periodically load at least one batch of event data 100 from the output file 150 to the object storage 30 according to a predetermined loading time interval. The predetermined combining loading interval can be, for example, five minutes.

The Apache Spark Cluster can load at least one batch of event data 100 from the RDD according to the predetermined loading time interval, each predetermined loading time interval can be referred to as a loading checkpoint. This is because the Apache Spark Cluster can append a batch of event data 100 to the RDD periodically according to the predetermined combining time interval. The Apache Spark Cluster can then load at least one batch of event data 100 appended to the RDD to the object storage 30.

The data processor can transform the output file 150. Specifically, the transformer 211 can transform the output file 150. Transforming the output file 150 includes, but is not limited to, at least one of the following: transforming the output file into a data warehouse compatible format; separating data and metadata in the output file 150; updating the metadata of the output file 150; partitioning the output file by an event field; and compressing the output file 150.

A compatible format may allow the data warehouse 40 to create derived tables by querying the output file 150 when stored in the object storage 30. The compatible format can be Iceberg or Delta format. The event field can be a date of events and/or name of events.

Iceberg and Delta are output file formats that are configured to store event data in a cloud object storage to be accessible by the data warehouse 40. The compatibility of the a file format of the output file 150 is dependent on the type of data warehouse 40. Advantageously, Iceberg and Delta file formats allow the data warehouse 40 to make changes to the event data 100 schema of the output files 150 stored in the object storage 30. Iceberg and Delta file formats also allow incremental changes to the output files in the object storage 30. Iceberg and Delta file formats also allow transformations, such as merge, update and delete operations, to the data of the output file 150. Iceberg and Delta also may store the a full history of edits made to the data of the output file 150.

If the output file 150 is in an Iceberg file format, the system 1240 may further comprise a catalog. The catalog comprises a pointer to a most recent location of the output file 150. The catalog also provides a locking mechanism for the data loader 20 such that a plurality of data loaders 20 do not cause concurrency issues when writing metadata files to the object storage 30. The catalog can be implemented in the data warehouse 40. When a first data loader 20 requests to load event data 100 to the object storage 30, the first data loader simultaneously, or just before, sends a pointer to the data warehouse 40. The pointer comprises an address of where the event data 100 is written to the object storage 30. The data warehouse 40 consequently knows the address of the first event data 100 loaded to the object storage 30 and reads or copies the event data 100 from the object storage 30 to the data warehouse 40 from the first address. When another second data loader 20 requests to load another new second event data 100 to the object storage 30, the another data loader 20 sends another pointer to the data warehouse 40, if there is a write conflict between the addresses of the new second event data 100 and the previous first event data 100 in the catalog of the data warehouse 40, the second data loader 20 updates the address where the new second event data 100 will be loaded in the object storage 30 to prevent overwriting the first event data 100.

Advantageously, a larger output file 150 can be generated in the local file system 240. In the illustrated embodiment, only two batches of event data are combined. However, any number of batches of event data can be combined in the local file system, as long as there is enough memory space to store the batches of event data. Advantageously, a larger amount of event data 100 can be loaded to the object storage per transformation of the output file 150 to the compatible format. This results in more efficient event data 100 loading to the object storage 30 because the data loader reduces the frequency of committing the transformation of the output file to the compatible format.

The data loader 20 loads the output file 150 to the object storage 30. The data loader 20 pushes the output file 150 to the object storage 30. Simultaneously, or soon thereafter, the data loader 20 can optionally send a control command to the data warehouse 40 to read and/or copy the output file 150 loaded to the object storage 30. Alternatively, the data warehouse 40 can read and/or copy the output file 150 from the object storage 30 on its own accord. The loading of the output file 150 can be atomic such that either: all the output file 150 in the local file system 240 is successfully uploaded to the object storage 30; or none of the output file 150 is uploaded to the object storage 30. The data processor can load any remaining event data 100 remaining in the local file system 240 to the object storage 30 if the streaming platform 10 fails In FIG. 9E, the data loader 20 has successfully loaded the output file 150 to the object storage 30. Optionally, the data processor can return an acknowledgement message 12 to the streaming platform 10 in response to receiving each first and second batch of event data 110, 120 from the streaming platform 10. Optionally, the data processor can return the acknowledgement message 12 only if all the event data in the batch of event data 100 from the streaming platform 10 has been successfully loaded to the object storage 30. Optionally, the data processor can load event data that failed to be loaded to the object storage 30 to another object storage for later recovery.

The output file 150 can be queried by the data warehouse 40 from the object storage 30 because the output file 150 has been transformed into the compatible format. Advantageously, the data warehouse 40 is not required to copy the output file 150 into the data warehouse 40 and separately execute the transformation of the output file 150 to the compatible format at the data warehouse 40 to query event data 100 in the output file 150. This reduces the amount of computation at the data warehouse 40 and allows more computing resources to be used in communication with data applications 50. Advantageously, multiple data warehouses 40 can query the same object file 150 in the object storage 30 instead of each data warehouse 40 having to copy the output file 150 and making separate individual queries. Advantageously, processing, transformation and storing all happen in the local file system 240 and therefore any process on the output file 150 will not be hindered by connections issues between the data loader 20 and a third-party supplier.

Figure 10:
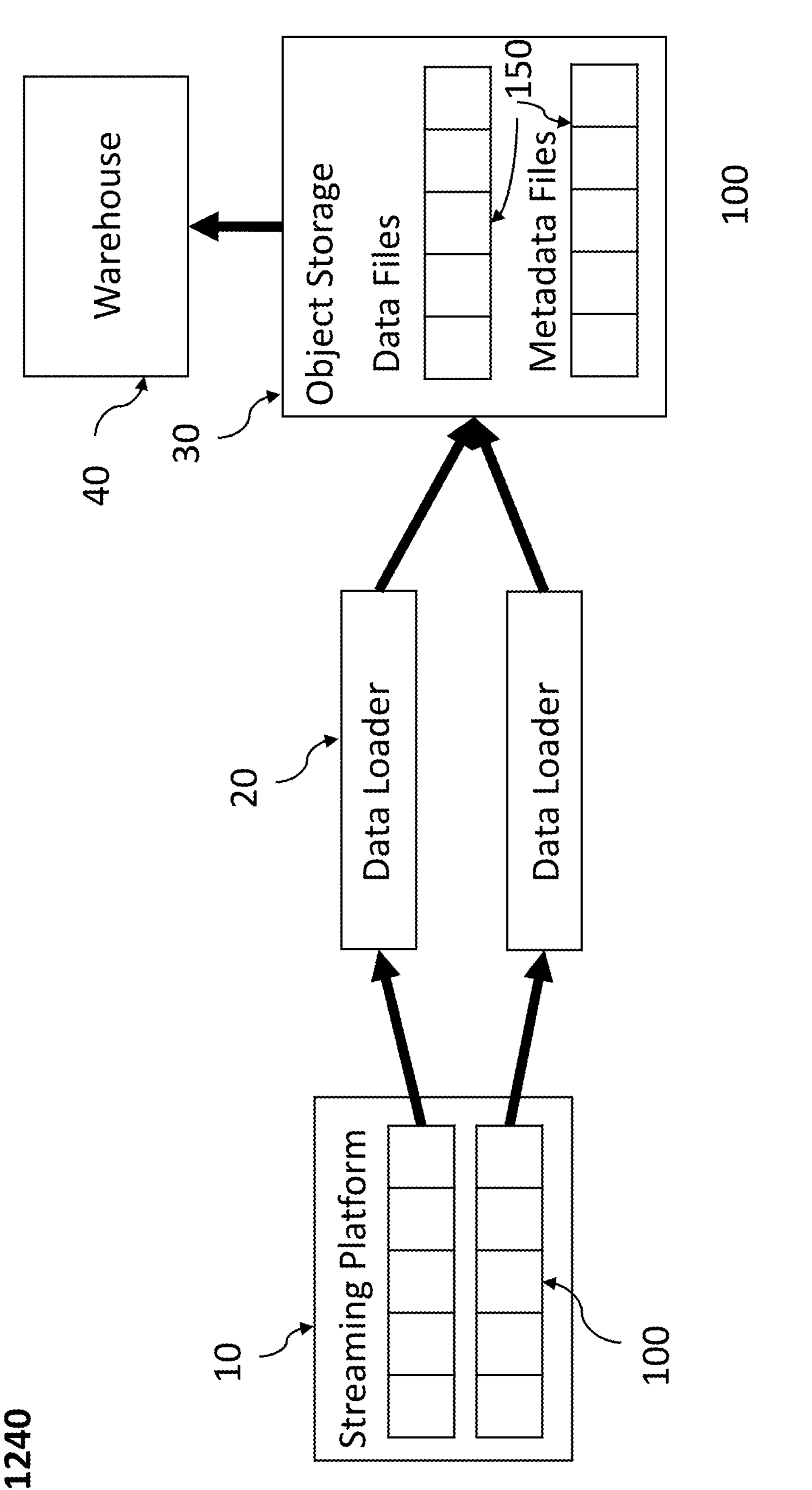
FIG. 10 shows the fourth system 1240 for storing event data 100, the system 1240 further comprises a plurality of data loaders 20 for loading event data 100 from the streaming platform 10 to the object storage 30.

FIG. 10 shows the fourth system 1240 for storing event data 100, the system 1240 further comprises a plurality of data loaders 20 for loading event data 100 from the streaming platform 10 to the object storage 30.

The system 1240 can comprise a plurality of data loaders 20. The streaming platform 10 can send event data 100 to the plurality of data loaders 20. The streaming platform 10 manages the distribution of event data 100 between the plurality of data loaders 20. Each of the plurality of data loaders 100 can receive event data 100 from a respective plurality of event data 100 streams in the streaming platform 10. The plurality of event data 100 streams can be independent of each other. For example, each event data 100 stream of the streaming platform 10 can be configured to receive event data 100 from different data producers 5. Additionally, each event data 100 stream may not share event data 100 with each other and each data loader 20 also may not share event data 100 with each other.

Advantageously, the system 1240 allows horizontal scaling. The system 1240 can increase the number of data loader 20 in response to an increase in the amount of event data 100 at the streaming platform 10.

FIG. 11 shows a table summarising characteristics of the fourth system 1240 for storing event data 100. The output file size of the data loader 20 is large because event data 100 is buffered in a local file system 1240 and therefore the size of the event data 100 loaded to the object storage 30 can be as large as the memory capacity of the local file system 240. A larger output file size facilitates more efficient event data 100 querying at the object storage 30 and reduces the time spent by the data loader 20 on committing the event data 100 to be transformed into a specific format per loading. The output file type of the data loader 20 is an iceberg or delta file and therefore metadata and the data file are both included in the output file 150 loaded into the object storage 30. The dynamic schema of the data loader 20 is enabled by the data loader 20 buffering a batch of event data 100 in the local file system 240. The system 1240 can add additional data loaders 20 to accommodate for increase in the size of the event data 100.

Figure 12:
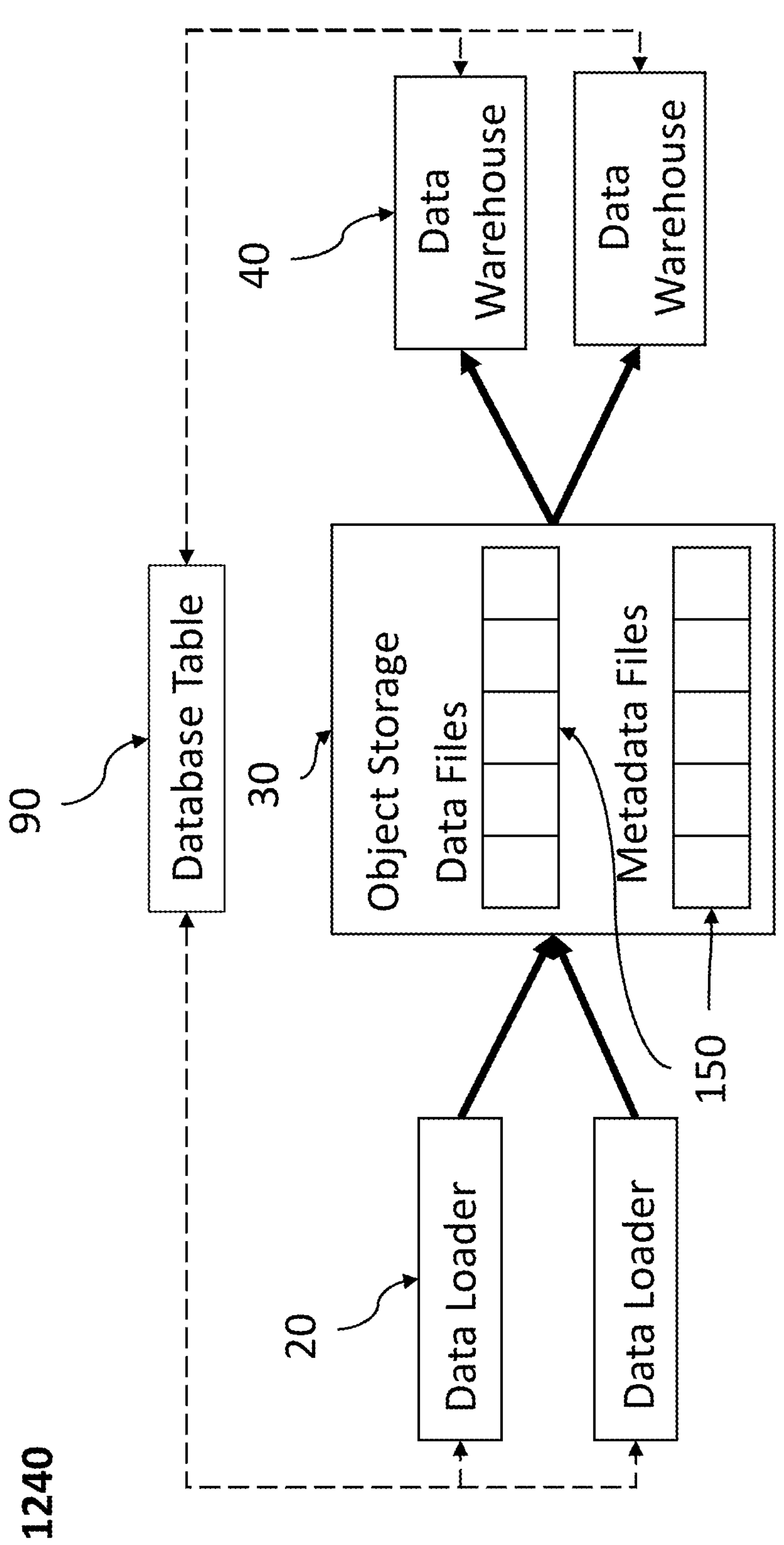
FIG. 12 shows the fourth system 1240 further comprising a database table 90 for providing a locking mechanism to prevent conflict between concurrent read and/or write commands from a plurality of data loaders 20 and/or a plurality of data warehouses 40.

FIG. 12 shows the fourth system 1240 further comprising a database table 90 for providing a locking mechanism to prevent conflict between concurrent read and/or write commands from a plurality of data loaders 20 and/or a plurality of data warehouses 40. The database table 90 comprises a shared lock and an exclusive lock. The database table 90 distribute the shared lock and the exclusive lock between the data loaders 20 and/or data warehouses 40.

A data loader 20 or data warehouse 40 with an exclusive lock has the exclusive right to write to the object storage 30. When a data loader 20 or data warehouse 40 with an exclusive lock is writing to the object storage 30, another data loader 20 or data warehouse 40 cannot write to the same location. The exclusive lock can be released by the data loader 20 or data warehouse 40 and subsequently the exclusive lock can be redistributed by the database table 90 for another data loader 20 or data warehouse 40 to write to the object storage 30.

A data loader 20 or data warehouse 40 with a shared lock can read output files in the object storage 30. Data loaders 20 and data warehouses 40 with the shared lock can read output files from the same location in the object storage 30. The shared lock does not allow a data loader 20 or data warehouse 40 to write to the object storage 30.

Figure 13:
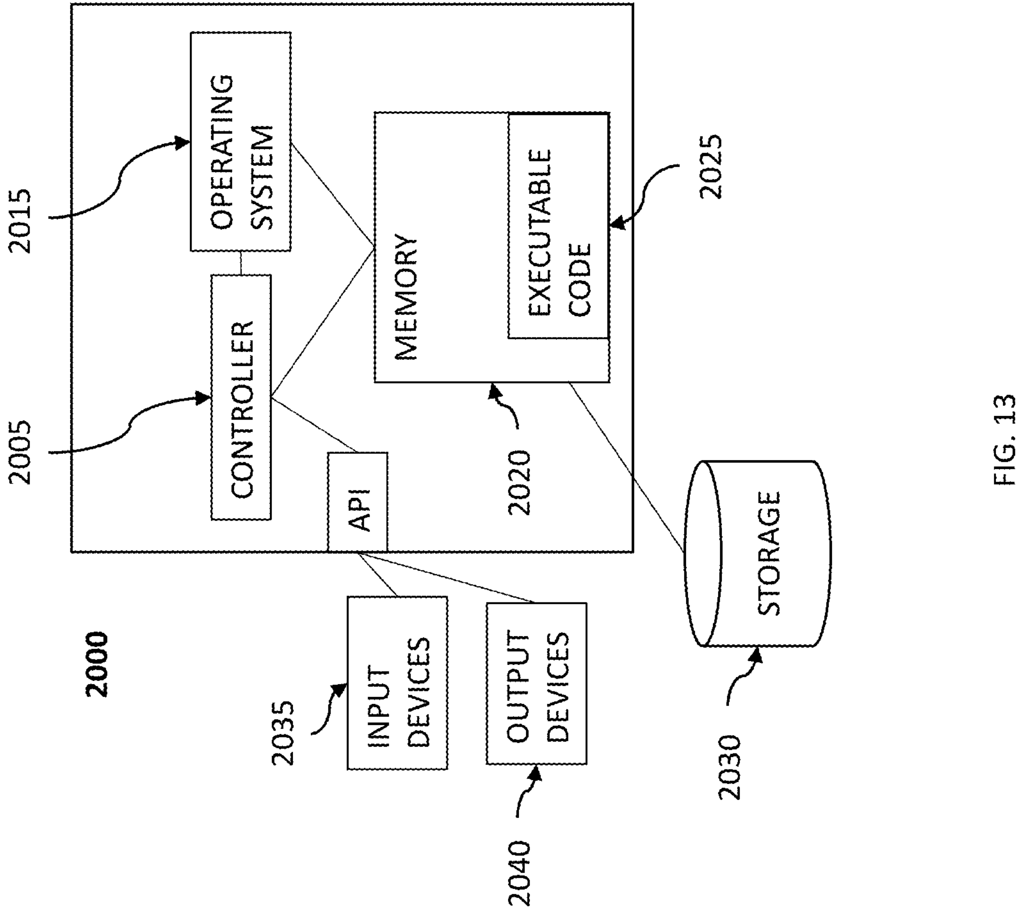
FIG. 13 shows a computing system 2000, on which any of the above-described methods may be performed.

FIG. 13 shows a computing system 2000, on which any of the above-described methods may be performed. In particular, the Computing system 2000 may comprise a single computing device or components such as a laptop, tablet, desktop or other computing device. Alternatively functions of system 2000 may be distributed across multiple computing devices.

The Computing system 2000 may include one or more controllers such as controller 2005 that may be, for example, a central processing unit processor (CPU), a graphics processing unit (GPU) a chip or any suitable processor or computing or computational device such as an FPGA mentioned, an operating system 2015, a memory 2020 storing executable code 2025, storage 2030 which may be external to the system or embedded in memory 2020, one or more input devices 2035 and one or more output devices 2040.

One or more processors in one or more controllers such as controller 2005 may be configured to carry out any of the methods described here. For example, one or more processors within controller 2005 may be connected to memory 2020 storing software or instructions that, when executed by the one or more processors, cause the one or more processors to carry out a method according to some embodiments of the present invention. Controller 2005 or a central processing unit within controller 2005 may be configured, for example, using instructions stored in memory 2020, to perform the method as described above.

Input devices 2035 may be or may include a mouse, a keyboard, a touch screen or pad or any suitable input device. It will be recognized that any suitable number of input devices may be operatively connected to computing system 2000 as shown by block 2035. Output devices 2040 may include one or more displays, speakers and/or any other suitable output devices. It will be recognized that any suitable number of output devices may be operatively connected to computing system 2000 as shown by block 2040. The input and output devices may for example be used to enable a user to select information, e.g., images and graphs as shown here, to be displayed.

In the embodiments described above, all or parts of the method may be performed by a server. The server may comprise a single server or network of servers. In some examples, the functionality of the server may be provided by a network of servers distributed across a geographical area, such as a worldwide distributed network of servers, and a user/operator of the method may be connected to an appropriate one of the network servers based upon, for example, a user location.

The embodiments described above are fully automatic. In some examples a user or operator of the system may manually instruct some steps of the method to be carried out.

In the described embodiments of the invention parts of the system may be implemented as a form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although illustrated as a single system, it is to be understood that a computing device may be a distributed system. Thus, for instance, several devices may be in communication by way of a network connection and may collectively perform tasks described as being performed by the computing device. Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

Aspects of the foregoing disclosure are defined in the following clauses:

I claim:

1. A data loader for loading event data from a streaming platform to an object storage, the data loader comprising:

a memory for caching event data;

a local file system for storing event data; and a data processor, wherein the data processor is configured to:

receive a plurality of batches of event data from the streaming platform;

for each batch of event data from the plurality of batches of event data:

cache the batch of event data to the memory; and write the batch of event data from the memory to the local file system;

periodically combine the plurality of batches of event data stored in the local file system into an output file according to a predetermined combining time interval; and load the output file from the local file system to the object storage;

wherein said loading comprises transforming the output file into a data warehouse compatible format with separate data and metadata files and partitioned by an event field.

2. A data loader according to claim 1, wherein the data processor is further configured to write the batch of event data from the memory to the local file system when the memory capacity is full.

3. A data loader according to claim 1, wherein the data processor is further configured to periodically load at least one batch of event data from the output file to the object storage according to a predetermined loading time interval.

4. A data loader according to claim 1, wherein the data warehouse compatible format allows a data warehouse to create derived tables by querying the output file stored in the object storage.

5. A data loader according to claim 1, wherein the data processor is configured to update the metadata of the output file.

6. A data loader according to claim 1, wherein the data processor is further configured to process the plurality of batches of event data from the streaming platform, wherein processing the event data from the streaming platform comprises:

dynamically determining a schema of the plurality of batches of event data; and/or determining a metadata of the plurality of batches of event data.

7. A data loader according to claim 1, wherein the data processor is configured to load any remaining event data stored in the local file system to the object storage if the streaming platform fails.

8. A data loader according to claim 1, wherein the data processor is configured to return an acknowledgement message to the streaming platform in response to receiving a batch of event data from the streaming platform.

9. A data loader according to claim 8, wherein the data processor is configured to return the acknowledgement message only if all the event data of the batch of event data from the streaming platform has been loaded to the object storage.

10. A system comprising a plurality of data loaders in accordance with claim 1 for loading event data from a streaming platform to an object storage, each data loader receiving batches of event data from the streaming platform and loading output files to the object storage.

11. A system according to claim 10, further comprising a database table for providing a locking mechanism between the plurality of data loaders to prevent conflict between concurrent read and/or write commands from the plurality of data loaders to the object storage.

12. A data loader according to claim 1, wherein the event field is a date of an event and/or a name of an event.

13. A data loader according to claim 1, wherein the predetermined combining time interval is five minutes.

14. A data loader according to claim 1, wherein the data processor is an Apache Spark Cluster and the output file is a resilient distributed dataset (RDD).

15. A computer implemented method for loading event data from a streaming platform to an object storage via a data loader comprising a memory for caching event data, a local file system for storing event data and a data processor, the method comprising:

receiving, by the data processor, a plurality of batches of event data from the streaming platform;

for each batch of event data from the plurality of batches of event data:

caching, by the data processor, the batch of event data to the memory; and writing, by the data processor, the batch of event data from the memory to the local file system;

periodically combining, by the data processor, the plurality of batches of event data stored in the local file system into an output file according to a predetermined combining time interval; and loading, by the data processor, the output file from the local file system to the object storage;

wherein said loading comprises transforming, by the data processor, the output file into a data warehouse compatible format with separate data and metadata files and partitioned by an event field.

16. A computer-readable medium comprising instructions which, when executed by a computer, cause the computer to carry out the method of claim 15.

* * * * *